Dec. 14, 1937.　　　G. E. POPE　　　2,102,279
CLUTCH PLATE
Filed Feb. 24, 1937　　　4 Sheets-Sheet 1
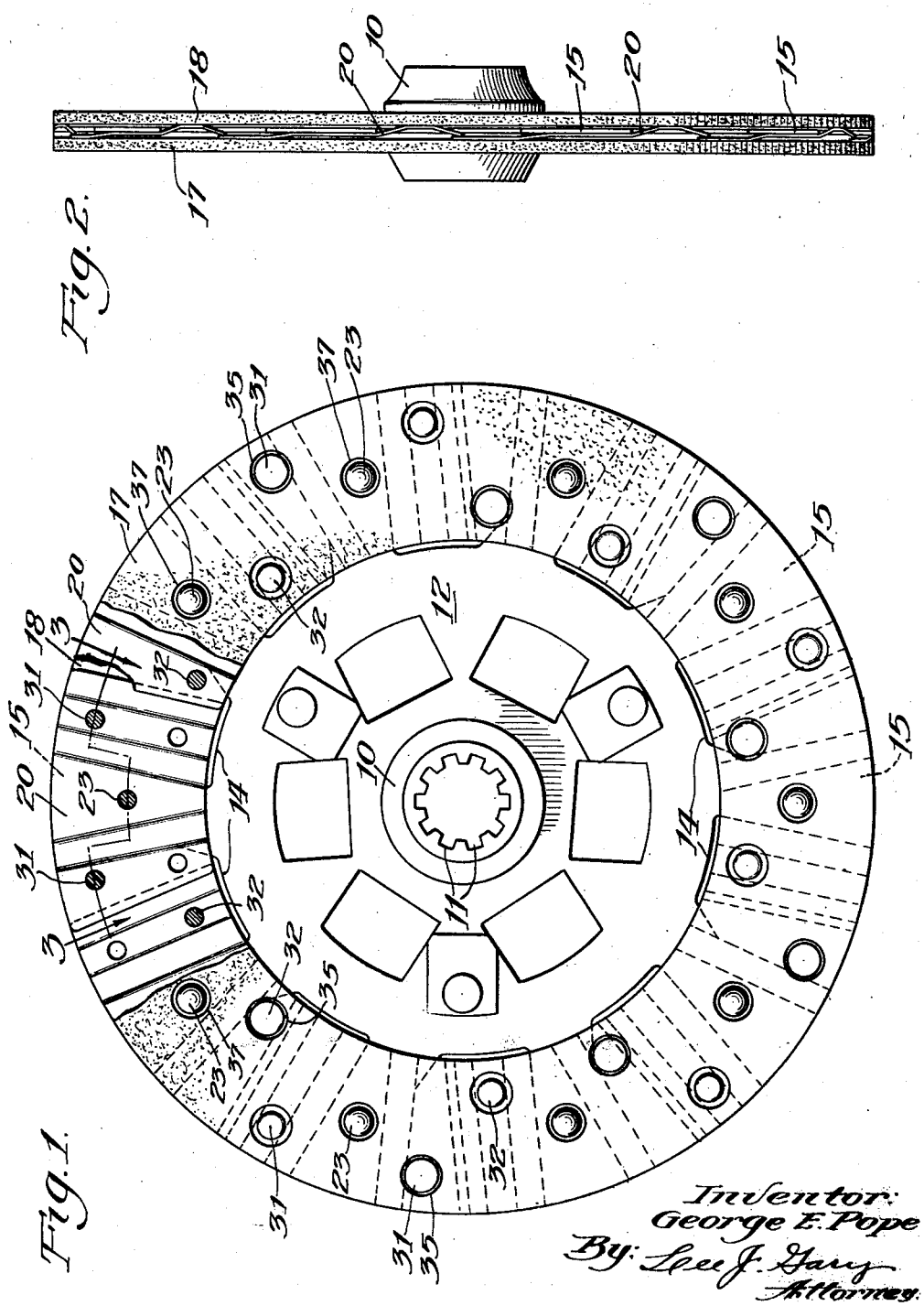

Dec. 14, 1937. G. E. POPE 2,102,279
CLUTCH PLATE
Filed Feb. 24, 1937    4 Sheets-Sheet 3
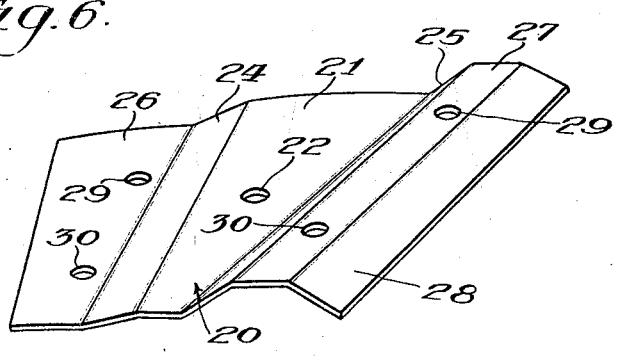
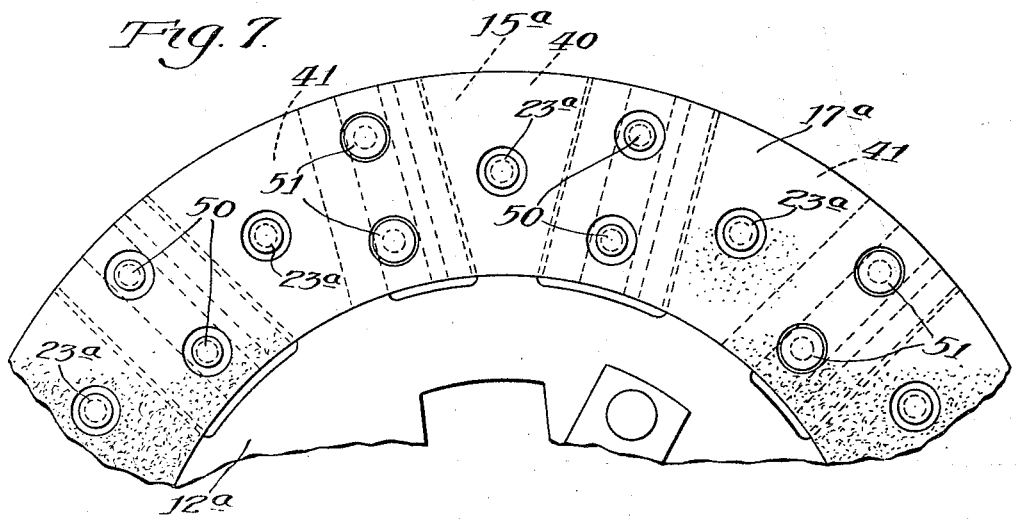
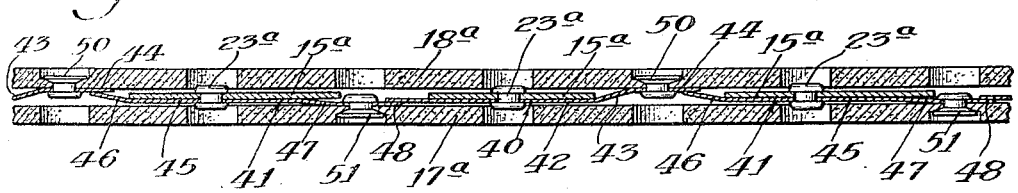
Inventor:
George E. Pope,
By: Lee J. Gary
Attorney.

Dec. 14, 1937. G. E. POPE 2,102,279
CLUTCH PLATE
Filed Feb. 24, 1937 4 Sheets-Sheet 4

Inventor:
George E. Pope,
By: Lee J. Gary
Attorney

Patented Dec. 14, 1937

2,102,279

UNITED STATES PATENT OFFICE 2,102,279

CLUTCH PLATE

George E. Pope, Stratford, Conn., assignor to Raybestos-Manhattan, Inc., Bridgeport, Conn., a corporation of Connecticut Application February 24, 1937, Serial No. 127,365

12 Claims. (Cl. 192—107)

This invention relates to clutch plates, such as used in automobiles, and more particularly to the type providing resilient or cushioned engagement between the driving and driven member.

It has long been recognized in the art to be advantageous and highly desirable to construct a clutch plate in a manner to provide a relatively resilient or cushioned engagement between the driving and driven members. Heretofore, many constructions have been proposed which were intended to impart resilient and smooth engagement to clutches, and in practically all instances such advantages attained have been at the sacrifice of efficiency and the resultant excessive wear of the friction facings at confined areas or zones, thus, materially reducing the life of the facings.

In conventional clutch constructions in common use, in addition to being open to the disadvantages above mentioned, are also objectionable because of the lack of smooth engagement, resulting in chattering.

The present invention is directed to an improved clutch plate assembly which obviates the foregoing objections and which provides one hundred (100%) percent engagement of the friction surface, insuring uniform wear and prolonged life of the friction facings. My improved clutch plate assembly comprises a mounting plate, a pair of parallel friction facings on opposite sides of the plate and an annular series of novel spring elements resiliently connecting the facings to the plate in spaced-apart relation. Said spring elements are formed and connected in a manner so that upon compression of the facings toward each other, one of the facings is rotated angularly a slight amount relatively to the other. This construction providing relative rotational movement of the facings thus permits picking up the torque load in a smooth manner, free from chatter, with the facings remaining substantially parallel during engagement of the clutch while it is acquiring full torque load.

Other objects and advantages of my improved clutch plate assembly will be apparent from the following description taken in connection with the accompanying drawings, in which:—

Fig. 1 is a face view, with parts broken away, of a clutch plate assembly embodying this invention.

Fig. 2 is an edge view of the clutch plate assembly.

Fig. 6 is an enlarged perspective view of one of the leaf spring elements.

Fig. 7 is a fragmentary face view, similar to Fig. 1, showing a modified form of the invention.

Fig. 8 is a section through the clutch plate assembly showing relation of the parts in inoperative position.

Figure 3:
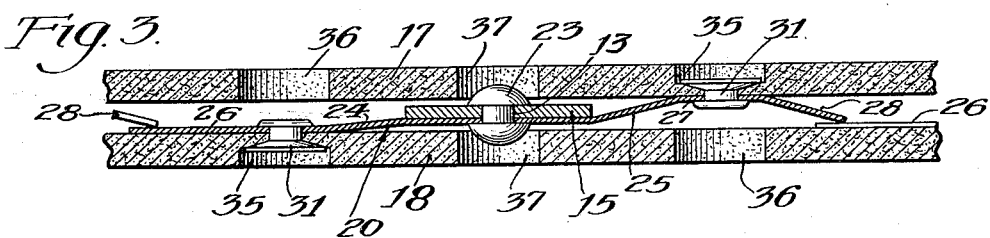
Fig. 3 is an enlarged, staggered sectional view through the assembly, taken at line 3—3 in Fig. 1, showing the friction facings in inoperative position.

The clutch plate assembly includes a supporting hub 10, which is provided with internal splines 11, to permit axial nonrotative movement on a clutch shaft (not shown). The hub may be understood to be provided with an annular flange to which is secured, by suitable fastening elements, a mounting plate 12, of generally circular form, provided at its outer marginal edge with a series of circumferentially spaced apart notches 14, the portions intermediate said notches, and designated at 15, serving as mounting fingers.

Disposed in parallel relation to each other on opposite sides of the mounting plate 12, are annular friction facings 17 and 18 which are connected to the mounting plate by a plurality of circularly spaced sectoral leaf springs 20. Each of said spring elements, as seen in Fig. 6, is formed with a flat intermediate portion 21, provided with an aperture 22, to permit connection of the spring element, through aperture 13 of a finger 15 of the mounting plate by a rivet 23. On opposite sides of said flat portion 21, are two inclined portions 24 and 25, extending in opposite directions, and continuing into flat portions 26 and 27, respectively, disposed substantially parallel to the intermediate flat portion 21, and said portion 27 continues into a reversely inclined portion 28, as seen in Fig. 6.

Figure 4:
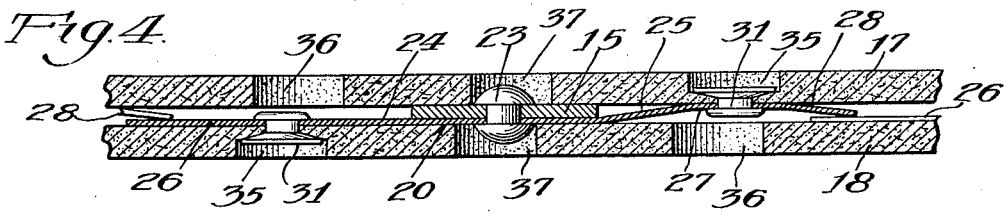
Fig. 4 is a view similar to Fig. 3, showing the relation of the parts in operating position.
Figure 5:
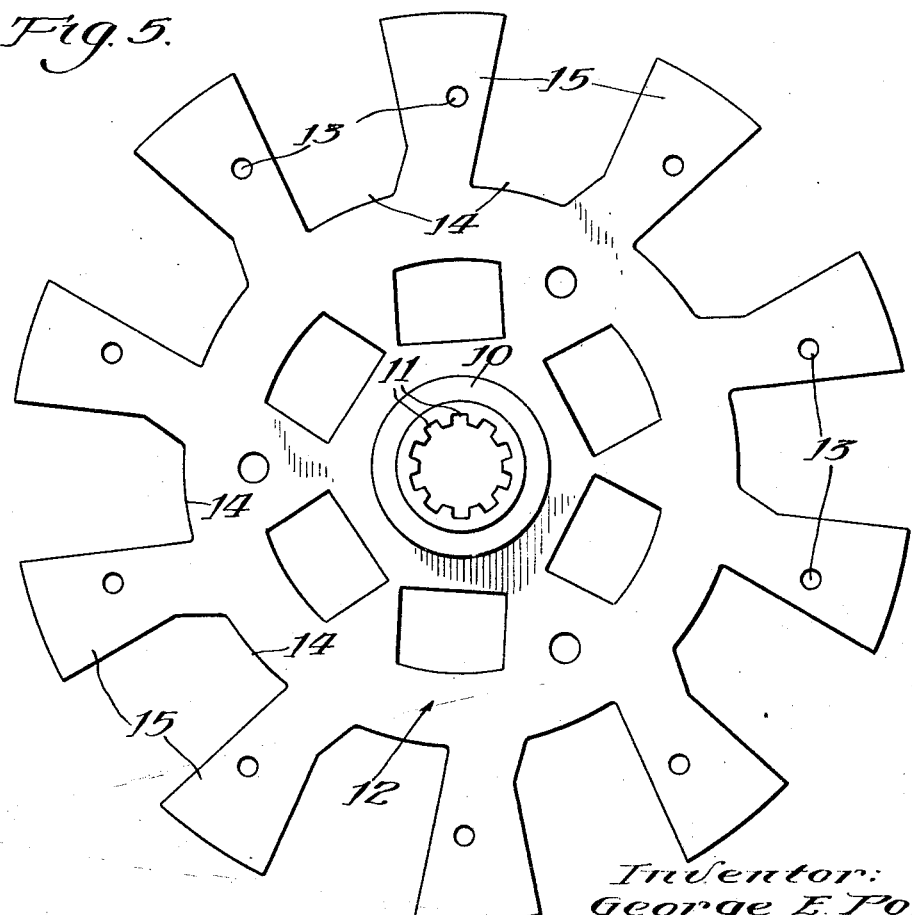
Fig. 5 is a plan view of the mounting plate.

Said portions 26 and 27 are provided with two series of apertures 29 and 30 for connection by rivets 31 and 32 respectively, to the friction facings 17 and 18. As seen in the drawings the spring elements 20 are arranged so that the free edge of portion 28 rests upon the surface of the portion 26 of the next adjacent spring element, and alternate spring elements are connected to the respective facings 17 and 18 by alternate pairs of rivets 31 and 32. Due to the form of the spring elements the friction facings are resiliently maintained in separated relation and as the clutch is engaged the facings are resiliently compressed together and due to the fact that each spring being connected to a finger of the mounting plate and connected at opposite ends to the opposite facing elements, it will be apparent that due to such compressive movement of the facings, one of said facing elements will be caused to rotate angularly relatively to the other, a slight amount as seen in Fig. 4. Such movement insures a smooth resilient pickup of the torque load, with full one hundred (100%) percent friction engagement of the entire friction surface of the facings, completely eliminating chattering and resulting in uniform wear of the operating surfaces of said facings, thus obtaining maximum life of the facings.

It will also be apparent that as the facings 17 and 18 are moved toward each other in clutching engagement, the springs tend to straighten out and the edge of the portion 28 of the spring slides over the portion 26 of the next adjacent spring element, thus preventing the edge of the spring from scuffing or in any manner embedding itself into the friction facing, thus insuring free sliding movement of the spring elements when the clutch is engaged or disengaged. The cushioning springs 20 are formed and spaced to provide sufficient support to appreciably reduce the space (distance between points of support on friction facings) to prevent occurrence of what is known in the art as "patterns" on facings, said patterns following the contour of the cushioning springs insofar as their lack of ability to apply uniform pressure to the facings. My novel arrangement of the springs also insures maintaining the facings in as nearly parallel relation as possible during the engagement of the clutch while it is picking up full torque.

To facilitate assembly of the friction facings 17 and 18, spring elements 20, and mounting plate 12, the facings are provided with shouldered apertures 35 for the rivets 31 and 32 and the friction facing element opposite the respective rivets are formed with apertures 36, and said facing elements are also formed with aligned apertures 37, registering with the rivets 23, connecting the spring elements 20, to the mounting plate 12. These apertures permit convenient assembly and riveting of the parts together.

In the modified form of the invention illustrated in Figs. 7 and 8 the friction facings 17ª and 18ª are connected to the mounting plate 12ª by two alternate series of circumferentially spaced leaf springs 40 and 41. Spring 40 includes a flat portion 42 connected by a rivet 23ª to a finger 15ª of the mounting plate 12ª, and an inclined portion 43, continuing into a flat portion 44, while spring 41 includes a flat portion 45 connected by a rivet 23ª to alternate fingers 15ª of the mounting plate, and angularly inclined portions 46 and 47 at opposite sides; the free edge of portion 46 slidably engaging the portion 44 of the next leaf spring 40 and the portion 47 continuing into a flat portion 48, upon which is slidably supported the edge of the portion 42 of the next adjacent spring 40. In this construction the leaf springs 40 are connected only to the friction facing element 18ª, by two radially spaced rivets 50, while the leaf spring elements 11 are only connected to friction facing element 17ª by a pair of radially spaced rivets 51. The construction of the clutch assembly otherwise is the same; and results in obtaining the same advantages, as in the construction above described. As the facings 17ª and 18ª are moved toward each other the spring elements tend to straighten out and the free edge of portion 46 of springs 41, slide over the portion 44 of the next adjacent spring 40, and portions 42 of springs 40 slide over portions 48 of spring 41, causing one facing to move angularly relatively to the other, resulting in a smooth cushioning engagement of the clutch as it picks up full torque load.

Figure 9:
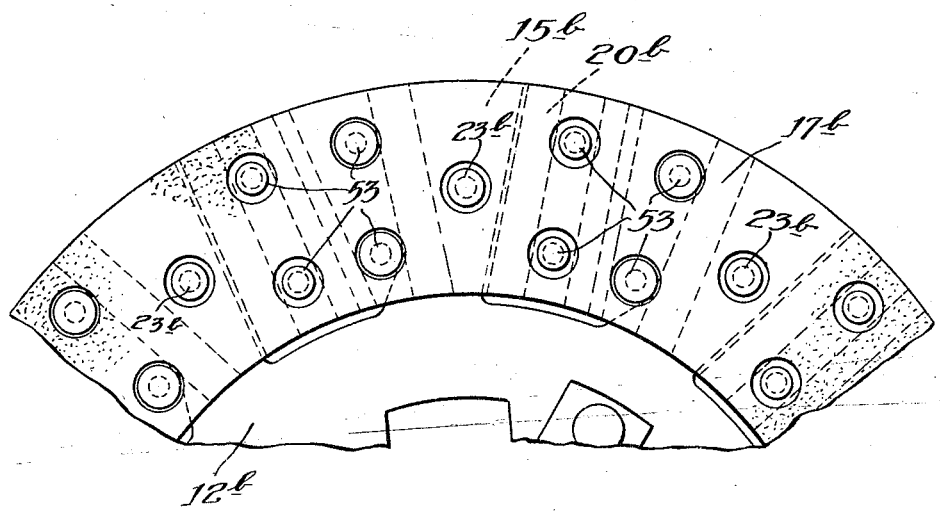
Fig. 9 is a fragmentary face view of a further modification of this invention.
Figure 10:
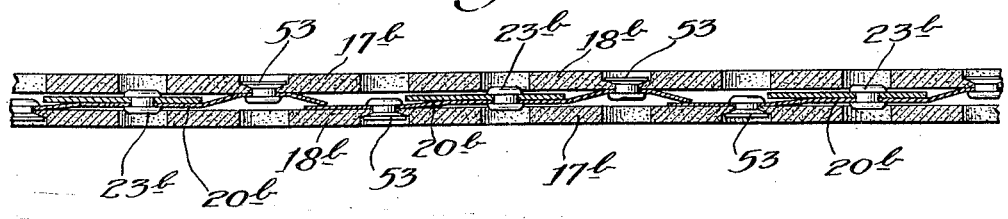
Fig. 10 is a section through the clutch plate assembly shown in Fig. 9, showing the relation of the parts in inoperative position.

Referring now to the modified construction shown in Figs. 9 and 10, the construction and arrangement of parts and operation of the device is identical to that shown in Figs. 1 to 6, except that each of the leaf spring elements 20ᵇ is secured at its opposite ends by two radially spaced apart rivets 53 to the annular friction facings 17ᵇ and 18ᵇ, while the intermediate portion 21ᵇ of each spring 20ᵇ is secured by a rivet 23ᵇ to a finger 15ᵇ of the mounting plate 12ᵇ.

It is to be understood that, if desired, I may employ in any of the constructions herein disclosed shouldered rivets, as shown in my co-pending application Serial No. 137,461, filed April 17, 1937, for connecting the mounting plate and annular friction facings, for limiting the separation of the facings to a predetermined amount, and thus maintaining said facings in substantially parallel relation to each other when pressure on said facings is relieved.

Although I have herein disclosed certain specific embodiments of my invention, manifestly it is capable of further modification and rearrangement of parts without departing from the spirit and scope thereof. I do not, therefore, wish to be understood as limiting the invention to the precise embodiments therein disclosed, except as I may be so limited in the appended claims.

I claim as my invention:

1. An improved clutch plate, comprising a mounting plate, a pair of annular friction facings disposed in juxtaposed relation on opposite sides of the plate, and means for securing said elements to the plate, including a plurality of overlapping circularly spaced sectoral leaf springs rigidly secured to said plate and to one of said facing elements, whereby application of pressure causes said facings to move toward each other for producing uniform, smooth resilient driving engagement.

2. An improved clutch plate, comprising a mounting plate, a pair of annular friction facings disposed in juxtaposed relation on opposite sides of the plate, and means for securing said elements to the plate, including a plurality of overlapping circularly spaced sectoral leaf springs rigidly secured to said plate and to both of said facing elements, whereby application of pressure causes said facings to move toward each other for producing uniform, smooth resilient driving engagement.

3. An improved clutch plate, comprising a mounting plate, a pair of annular friction facings disposed in juxtaposed relation on opposite sides of the plate, and means for securing said elements to the plate, including a plurality of overlapping circularly spaced sectoral leaf springs, each of said springs being rigidly secured to said plate adjacent the middle of its length, and secured adjacent its ends to the opposite facing elements.

4. An improved clutch plate, comprising a mounting plate, a pair of annular friction facings disposed in juxtaposed relation on opposite sides of the plate, and means for securing said elements to the plate, including a plurality of circularly spaced sectoral leaf springs, rigidly secured to said plate and to one of said facing elements, one end of each spring being laterally offset and disposed in overlapping relation to the next adjacent spring, whereby application of pressure moves said facings toward each other and causes distension of said springs and relative angular movement of said facings, with said offset end of each spring sliding along and over the next adjacent spring.

5. An improved clutch plate, comprising a mounting plate, a pair of annular friction facings disposed in juxtaposed relation on opposite sides of the plate, and means for securing said elements to the plate, including a plurality of circularly spaced sectoral leaf springs rigidly secured to said plate and to both of said facing elements, one end of each spring being laterally offset and disposed in overlapping relation to the next adjacent spring, whereby application of pressure moves said facings toward each other and causes distension of said springs and relative angular movement of said facings, with said offset end of each spring sliding along and over the next adjacent spring.

6. An improved clutch plate comprising a mounting plate, a pair of annular friction facing elements disposed on opposite sides of said plate, and a plurality of overlapping circularly spaced sectoral leaf springs rigidly secured to said plate and engaging the adjacent faces of the respective facing elements, whereby the application of pressure causes said facings to resiliently move toward each other for producing smooth and uniform clutch engagement.

7. An improved clutch plate comprising a mounting plate, a pair of annular friction facing elements disposed on opposite sides of said plate, and a plurality of circularly spaced sectoral leaf springs rigidly secured to said plate and engaging the adjacent faces of the respective facing elements, one end of each spring being laterally offset and disposed in overlapping relation to the end of the next adjacent spring, whereby the application of pressure causes said facings to resiliently move toward each other for producing smooth and uniform clutch engagement.

8. An improved clutch plate comprising a pair of axially spaced apart annular friction facings, and a plurality of overlapping circularly spaced sectoral leaf springs interposed between said facings, each of said springs having its ends connected to the opposite facing elements.

9. An improved clutch plate comprising a pair of axially spaced apart annular friction facings, and a plurality of circularly spaced sectoral leaf springs interposed between said facings, each of said springs having its ends connected to the opposite facing elements, one end of each spring being laterally offset and disposed in overlapping relation to the end of the next adjacent spring.

10. An improved clutch plate, comprising a mounting plate, a pair of annular friction facings disposed in juxtaposed relation on opposite sides of the plate, and means for securing said elements to the plate, including a plurality of circularly spaced sectoral leaf springs, rigidly secured to said plate and to one of said facing elements, the outer edge of said plate being formed with circumferentially spaced notches to accommodate the springs for attachment to the clutch facings, one end of each spring being laterally offset and disposed in overlapping relation to the next adjacent spring, whereby application of pressure moves said facings toward each other and causes distension of said springs and relative angular movement of said facings, with said offset end of each spring sliding along and over the next adjacent spring.

11. An improved clutch plate, comprising a mounting plate, a pair of annular friction facings disposed in juxtaposed relation on opposite sides of the plate, and means for securing said elements to the plate, including a plurality of circularly spaced sectoral leaf springs rigidly secured to said plate and to both of said facing elements, the outer edge of said plate being provided with a plurality of circumferentially spaced notches to permit attachment of said springs to the respective clutch facings, one end of each spring being laterally offset and disposed in overlapping relation to the next adjacent spring, whereby application of pressure moves said facings toward each other and causes distension of said springs and relative angular movement of said facings, with said offset end of each spring sliding along and over the next adjacent spring.

12. An improved clutch plate comprising a mounting plate, a pair of parallel annular friction facing elements disposed on opposite sides of said plate, and overlapping resilient means connecting said facings to the mounting plate, and normally maintaining said facings in spaced relation to said plate, said means being formed so that upon compression of the facing elements toward each other, one of said facing elements is moved angularly relatively to the other facing element.

GEORGE E. POPE.